US012280606B2

(12) United States Patent
Sato

(10) Patent No.: US 12,280,606 B2
(45) Date of Patent: Apr. 22, 2025

(54) RECORDING APPARATUS AND METHOD FOR RECORDING

(71) Applicant: CANON KABUSHIKI KAISHA, Tokyo (JP)

(72) Inventor: Kyohei Sato, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 163 days.

(21) Appl. No.: 17/752,589

(22) Filed: May 24, 2022

(65) Prior Publication Data

US 2022/0379641 A1 Dec. 1, 2022

(30) Foreign Application Priority Data

May 28, 2021 (JP) ................................ 2021-090148

(51) Int. Cl.
*B41J 29/393* (2006.01)
*B41J 2/14* (2006.01)
*B41J 2/175* (2006.01)

(52) U.S. Cl.
CPC ............... *B41J 29/393* (2013.01); *B41J 2/14* (2013.01); *B41J 2/17503* (2013.01)

(58) Field of Classification Search
CPC ........ B41J 29/38; B41J 2/17566; B41J 2/175; B41J 2/17509; B41J 19/202; B41J 29/13; B41J 2/17523; B41J 2/17503; B41J 2/14; B41J 2002/17569; B41J 29/393
See application file for complete search history.

(56) References Cited

U.S. PATENT DOCUMENTS

2020/0039216 A1* 2/2020 Arakane .............. B41J 2/04563
2020/0101720 A1* 4/2020 Arakane .................. B41J 29/38

FOREIGN PATENT DOCUMENTS

JP 2015-147423 A 8/2015

* cited by examiner

*Primary Examiner* — Jannelle M Lebron
(74) *Attorney, Agent, or Firm* — CANON U.S.A., INC. IP DIVISION

(57) ABSTRACT

A recording apparatus includes an ink tank, a recording head, a carriage, an ink supply channel, one or more memory devices, and one or more processors to execute the set of instructions to perform operations including causing the recording head to eject the ink based on print data to perform recording on a recording medium; and obtaining, based on the print data, information on an amount of ink to be ejected to a recordable area in which the carriage moves in one of the first direction and the second direction. A length of the ink supply channel from the bend to the recording head increases in the first direction and decreases in the second direction. The one or more processors changes acceleration of the carriage according to the amount of ink to be ejected to the recordable area, the amount being indicated by the information.

16 Claims, 10 Drawing Sheets

RECORDING APPARATUS AND METHOD FOR RECORDING

BACKGROUND

Field of the Disclosure

The present disclosure relates to recording apparatuses and a method for recording.

Description of the Related Art

Japanese Patent Laid-Open No. 2015-147423 discloses a configuration of an ink-jet recording apparatus in which ink is supplied from ink tanks to a recording head through tubes using a water head difference.

Such an ink-jet recording apparatus prevents ink from dripping off by maintaining negative pressure in the recording head using the water head difference to keep a meniscus using surface tension generated in the nozzle of the recording head. The pressure in the recording head is decreased as the ink in the recording head is ejected, thereby charging the ink into the recording head from the ink tanks through the tubes.

The ink in the tubes is acted upon by an inertia force due to the acceleration/deceleration of the recording head which is moving back and forth. In recording an image that needs to eject a lot of ink from the recording head in a short time, the internal pressure of the recording head is significantly decreased with the ejection of the ink. However, since the reciprocating movement of the recording head exerts an inertia force on the ink in the tubes, the recording head may not be sufficiently supplied with ink through the tubes. The supply of insufficient amount of ink causes an ink ejection failure, which affects the quality of the image.

SUMMARY

In an aspect of the present disclosure, a recording apparatus includes an ink tank configured to store ink, a recording head including a nozzle that ejects the ink, a carriage having the recording head on board and configured to reciprocate in a first direction and a second direction, an ink supply channel configured to supply the ink from the ink tank to the recording head and having a bend that moves with movement of the carriage, one or more memory devices that store a set of instructions, and one or more processors to execute the set of instructions to perform operations including causing the carriage to move, causing the recording head to eject the ink based on print data to perform recording on a recording medium; and obtaining, based on the print data, information on an amount of ink to be ejected to a recordable area in which the carriage moves in one of the first direction and the second direction, wherein a length of the ink supply channel from the bend to the recording head increases in the first direction and decreases in the second direction, wherein the one or more processors changes acceleration of the carriage according to the amount of ink to be ejected to the recordable area, the amount being indicated by the information.

Further features of the present disclosure will become apparent from the following description of exemplary embodiments with reference to the attached drawings.

DESCRIPTION OF THE EMBODIMENTS

First Embodiment

An embodiment of the present disclosure will be described hereinbelow with reference to the accompanying drawings.

Figure 1:
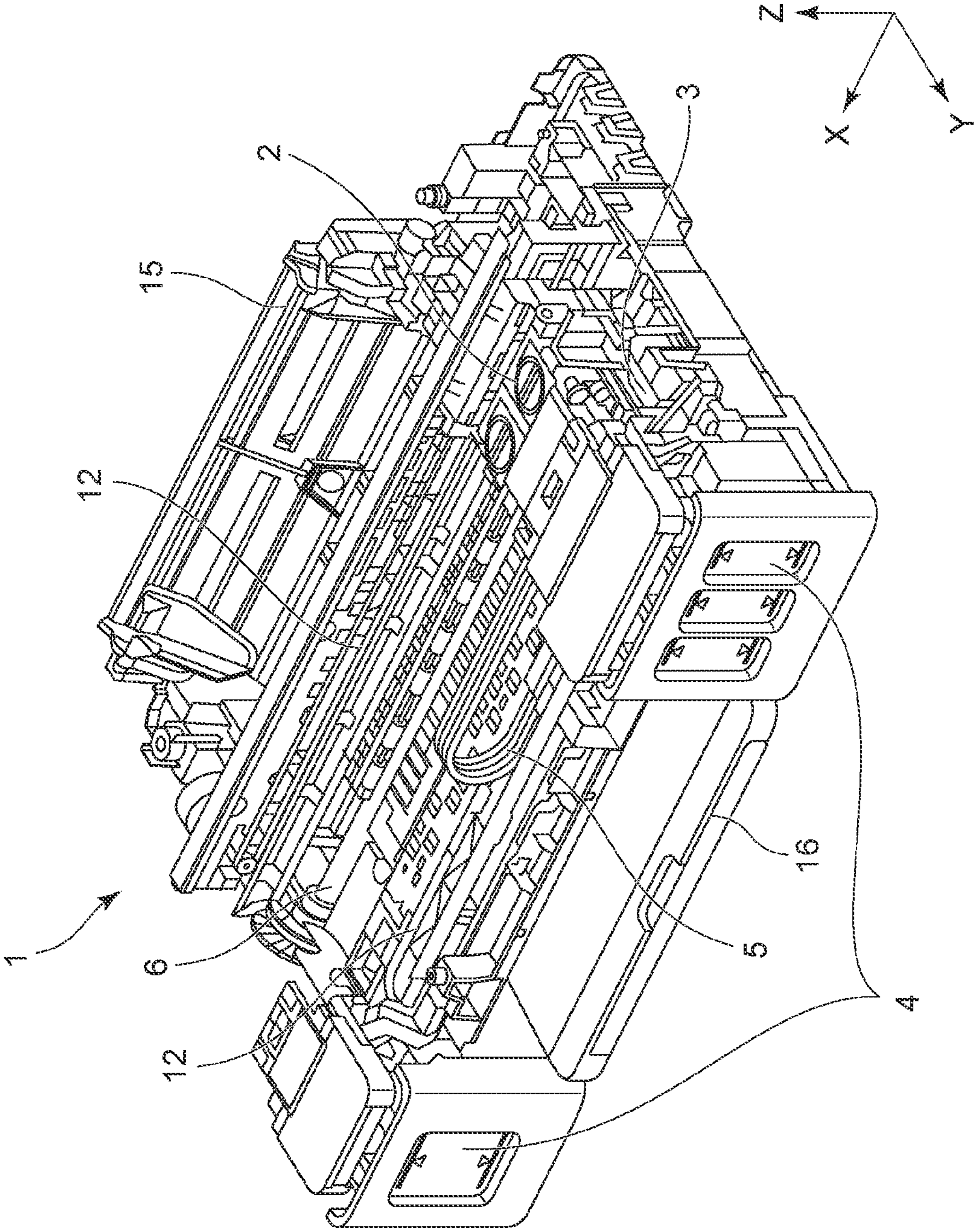
FIG. 1 is a schematic perspective view of an ink-jet recording apparatus according to an embodiment.

FIG. 1 is a perspective view of an ink-jet recording apparatus 1 according to this embodiment.

The ink-jet recording apparatus 1 includes a carriage 2, recording heads 3 held by the carriage 2, ink tanks 4 that store ink, ink supply channels 5 for supplying the ink in the ink tanks 4 to the recording heads 3, a sheet feed tray 15, and a cassette 16. A configuration for feeding, conveying, and discharging sheets incudes a feed roller (not shown), a conveying roller 6, and a sheet discharge roller (not shown).

Schematic Configuration of Apparatus Main Body

The image recording operation of the ink-jet recording apparatus 1 will be described. The recording media stacked in the sheet feed tray 15 or the cassette 16 are separated one by one by the feed roller and are fed to the conveying roller 6. The skew of each fed recording medium is corrected by bringing the leading end of the recording medium into abutment against the stopped or reversing conveying roller 6. Then, the recording medium is conveyed to a position where the recording medium faces the recording heads 3 by the conveying roller 6. The recording heads 3 are detachably mounted on the carriage 2. The carriage 2 is supported by guide rails 12 so as to be movable in the direction (X direction) perpendicular to the recording-media conveying direction (Y direction). The carriage 2 moves along the guide rails 12. The recording heads 3 eject ink to the recording medium conveyed to the position facing the recording heads 3 while being moved by the carriage 2 in the X direction to form one band of images on the recording medium. One band (recordable area) is an area in which the recording heads 3 can perform recording by moving in one direction. The recording medium on which one band of images is formed is moved by the conveying roller 6 by a predetermined amount in the +Y direction 1 to form the next one band of images. By repeating the image forming operation and the conveying operation, an image is formed on the entire recording medium. The recording medium on which the image is formed is discharged by the discharge roller.

Ink Supply System

Figure 2:
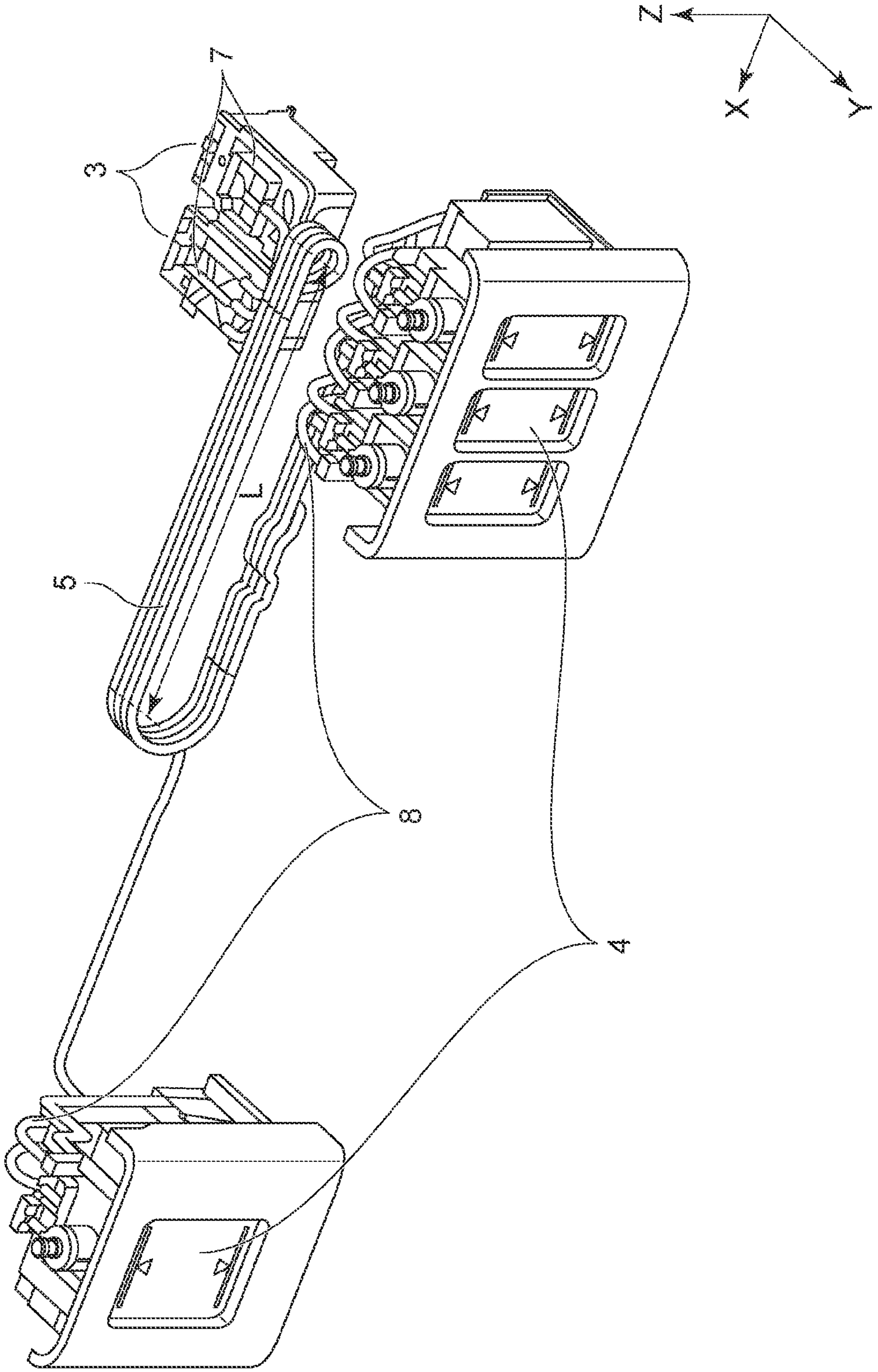
FIG. 2 is a schematic diagram illustrating an ink supply system according to a first embodiment.
Figure 3:
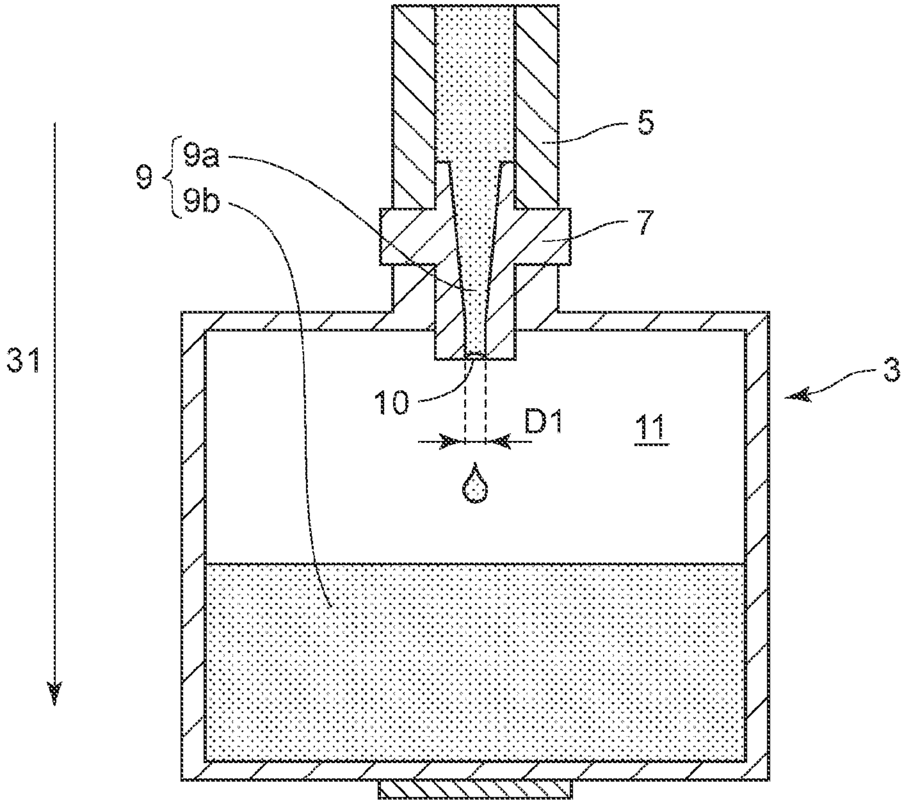
FIG. 3 is a schematic diagram illustrating the configuration of the connection between a recording head and an ink supply channel according to the embodiment.

FIG. 2 is a schematic diagram illustrating an ink supply system of the ink-jet recording apparatus 1 according to this embodiment. The ink tanks 4 are provided on the front of the main body of the ink-jet recording apparatus 1. Each ink supply channel 5 made of a flexible material connects each ink tank 4 to a tube joint 7 provided on the top of the recording head 3. Each ink tank 4 is fitted with an air communication path 8 for communicating the interior of the ink tank 4 with the atmosphere. FIG. 3 is a schematic diagram illustrating the configuration of the connection between the recording head 3 and the ink supply channel 5. As shown in FIG. 3, the tube joint 7 connected between the recording head 3 and the ink supply channel 5 has an inside diameter D1 sufficient to form a meniscus 10 due to the surface tension of ink 9*a* in the ink supply channel 5. The ink 9*a* in the ink supply channel 5 is supplied in the direction of gravitational force 31 in the recording head 3 via the tube joint 7. In other words, the ink 9*a* in the tube joint 7 and ink 9*b* in the recording head 3 are separated from each other by an air space 11. This allows the pressure in the recording head 3 to be kept constant unless a pressure change exceeding the withstand pressure P2 of the meniscus 10 is generated. This also prevents the ink 9*b* in the recording head 3 from flowing back into the ink supply channel 5. As shown in FIG. 2, the ink supply channels 5 connected to the ink tanks 4 extend parallel to the X direction, which is the moving and scanning direction of the carriage 2, on the +X side of the connecting portion of the recording heads 3 and each have a bend at an intermediate point. In other words, each ink supply channel 5 has a portion parallel to the guide rails 12. Since the bends of the ink supply channels 5 change with the movement of the carriage 2, the length L from the bend of each ink supply channel 5 to the connecting portion of the recording head 3 changes with the reciprocal movement of the carriage 2. In this embodiment, when the carriage 2 moves from the −X side to the +X side (moves on the forward path), the length L from the bend of the ink supply channel 5 to the connecting portion of the recording head 3 becomes short.

When the carriage 2 moves from the +X side to the −X side (moves on the backward path), the length L from the bend of the ink supply channel 5 to the connecting portion of the recording head 3 becomes long. Such movement of the carriage 2 causes an inertia force in the ink 9*a* in the ink supply channel 5 with the length L. This inertia force is generated when the carriage 2 is accelerated and decelerated to move the ink 9*a* in the ink supply channel 5, thereby causing a dynamic pressure to change the internal pressure of the recording head 3. This embodiment uses this phenomenon to control the acceleration of the carriage 2 at acceleration and deceleration at the reciprocating movement of the carriage 2 to move the ink 9*a* in the ink supply channel 5 to the recording head 3, thereby reducing a decrease in the pressure in the recording head 3.

Block Diagram

Figure 4:
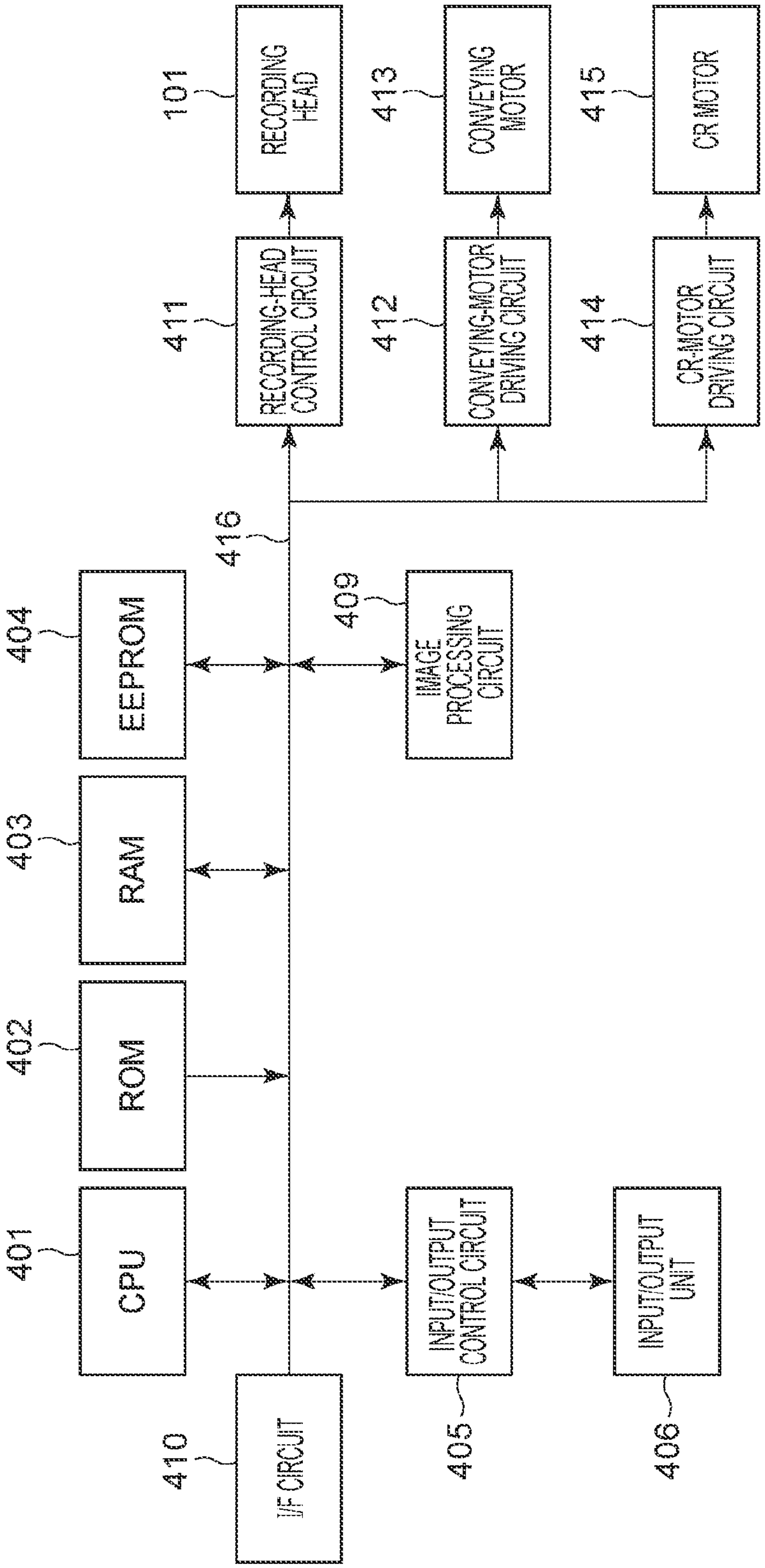
FIG. 4 is a block diagram of a control system according to the embodiment.

FIG. 4 is a block diagram illustrating the configuration of the control system of the ink-jet recording apparatus 1. A read-only memory (ROM) 402 is a nonvolatile memory which stores, for example, a program for controlling the ink-jet recording apparatus 1 and a program for implementing the operation of this embodiment. The operation of this embodiment is implemented by, for example, a central processing unit (CPU) 401 that reads and executes the program stored in the ROM 402 into a random-access memory (RAM) 403. The RAM 403 is also used as a working memory for the CPU 401. An electrically erasable programmable read-only memory (EEPROM) 404 stores data that should be stored even when the power supply to the ink-jet recording apparatus 1 is turned off.

An interface (I/F) circuit 410 connects the ink-jet recording apparatus 1 to an external network, such as a local area network (LAN). The ink-jet recording apparatus 1 transmits and receives various jobs and data to and from an external device, such as a host computer, via the I/F circuit 410.

An input/output unit 406 includes an input section and an output section. The input section receives an instruction to turn on the power, an instruction to execute recording, and instructions to set various functions from the user. The output section displays various items of apparatus information, such as a power-saving mode, and setting screens for various functions that can be executed by the ink-jet recording apparatus 1. In this embodiment, the input/output unit 406 is an operation panel provided on the ink-jet recording apparatus 1. The input/output unit 406 is connected to a system bus 416 via the input/output control circuit 405 so as to be capable of transmission and reception of data. In this embodiment, the CPU 401 controls information notification of the output section.

The input section may be the keyboard of the external host computer so that user's instructions can be received from the external host computer. The output section may be a light-emitting diode (LED) display, a liquid crystal display (LCD), or a display connected to the host device. If the input/output unit 406 is a touch panel, user's instructions can be received with a software keyboard. The input/output unit 406 may be a speaker and a microphone to output notification to the user by voice and input user's instruction by voice.

Alternatively, an external information processing apparatus including a CPU and a ROM that have the same functions as those of the CPU 401 and the ROM 402 and connected to the ink-jet recording apparatus 1 may perform a recording-medium determination process (described later) to determine recording media to be used in the ink-jet recording apparatus 1.

A recording-head control circuit 411 supplies a drive signal according to the record data to a nozzle driving circuit mounted on each recording head 3 and including a selector and a switch to control the recording operation of the recording heads 3, such as nozzle drive sequence. For example, when print data is sent from the outside to the I/F circuit 410, the print data is temporarily stored in the RAM 403. The recording-head control circuit 411 drives the recording heads 3 on the basis of record data for recording converted from the print data. At that time, a conveying-motor driving circuit 412 drives a conveying motor 413 on the basis of, for example, the band width of the record data to rotate the conveying roller 6 connected to the conveying motor 413, thereby conveying the recording media. A carriage-motor (CR-MOTOR) driving circuit 414 drives a CR motor 415 to move the carriage 2 along the guide rails 12 with a carriage belt.

The data sent from the I/F circuit 410 includes not only the print data but also data with content that is set by the printer driver. The print data may be received from the outside via the I/F circuit 410 and stored in a storage or may be stored in a storage, such as a hard disk, in advance. The CPU 401 reads the print data from the storage and converts the print data to record data for using the recording head 3 by controlling an image processing circuit 409 (binarizing process). The image processing circuit 409 executes, in addition to the binarizing process, color space conversion, HV conversion, gamma correction, image rotation, and other various image processing operations.

Figure 5A:
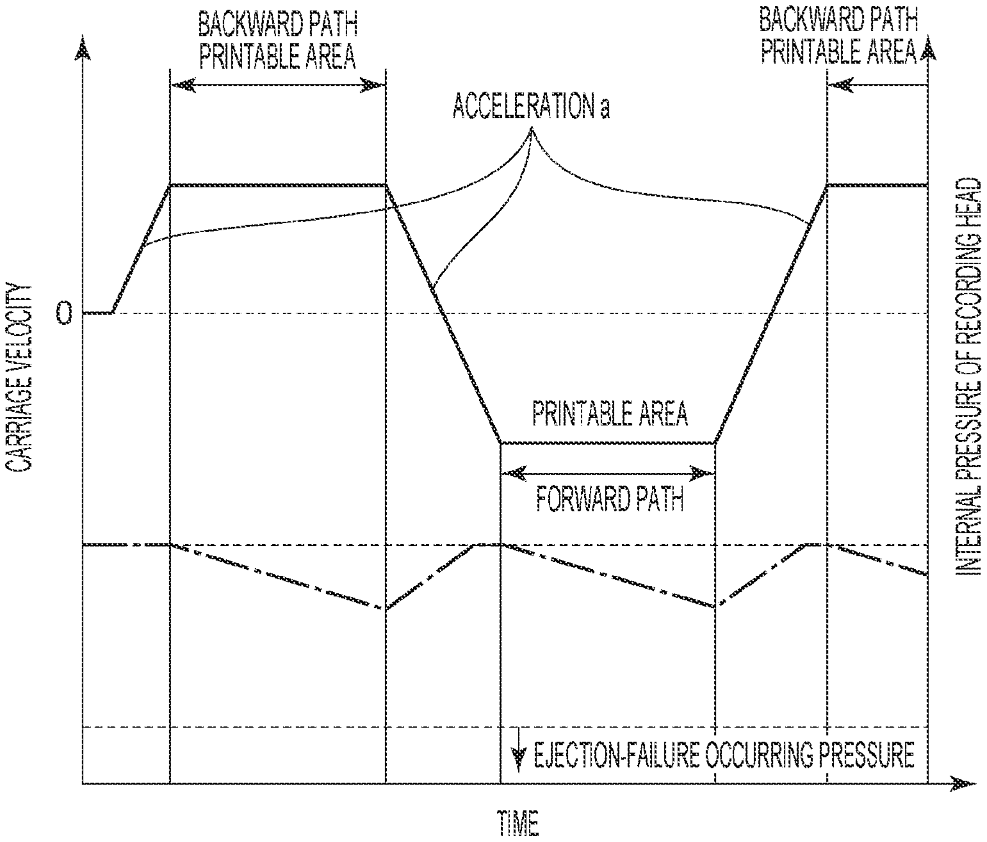
FIG. 5A is a graph showing the relationship between the velocity of the carriage and the internal pressure of the recording head according to the embodiment.
Figure 5B:
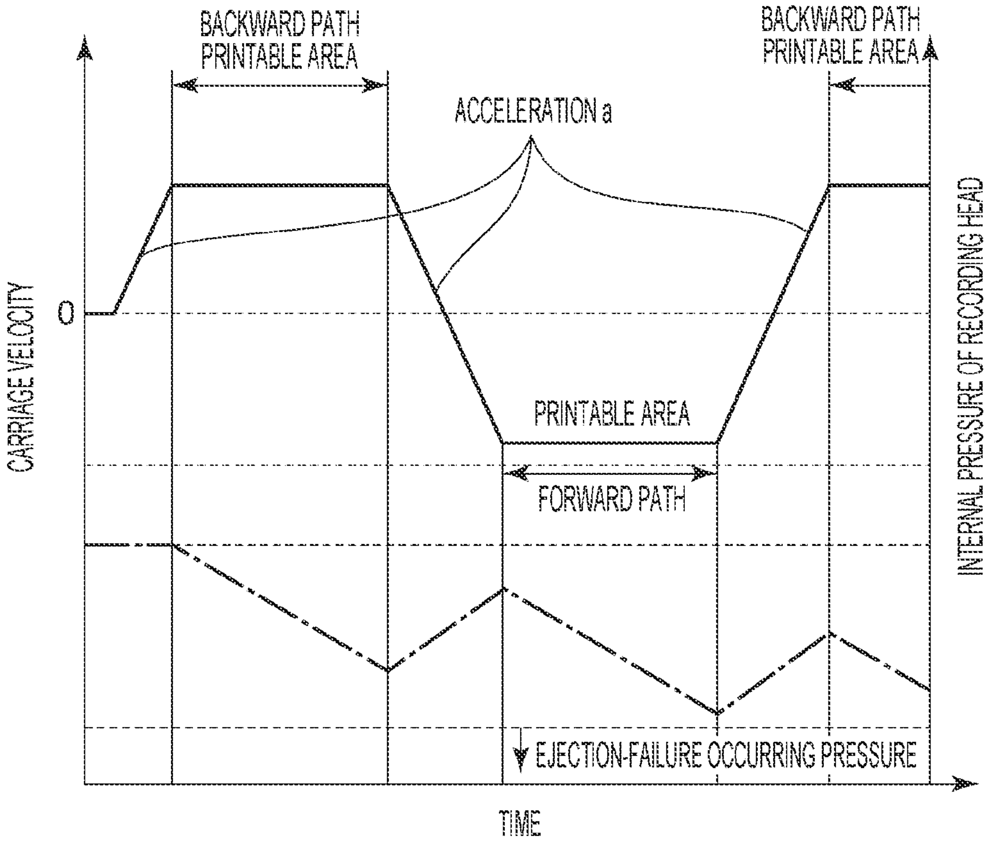
FIG. 5B is a graph showing the relationship between the velocity of the carriage and the internal pressure of the recording head using a profile 1 according to the embodiment.
Figure 5C:
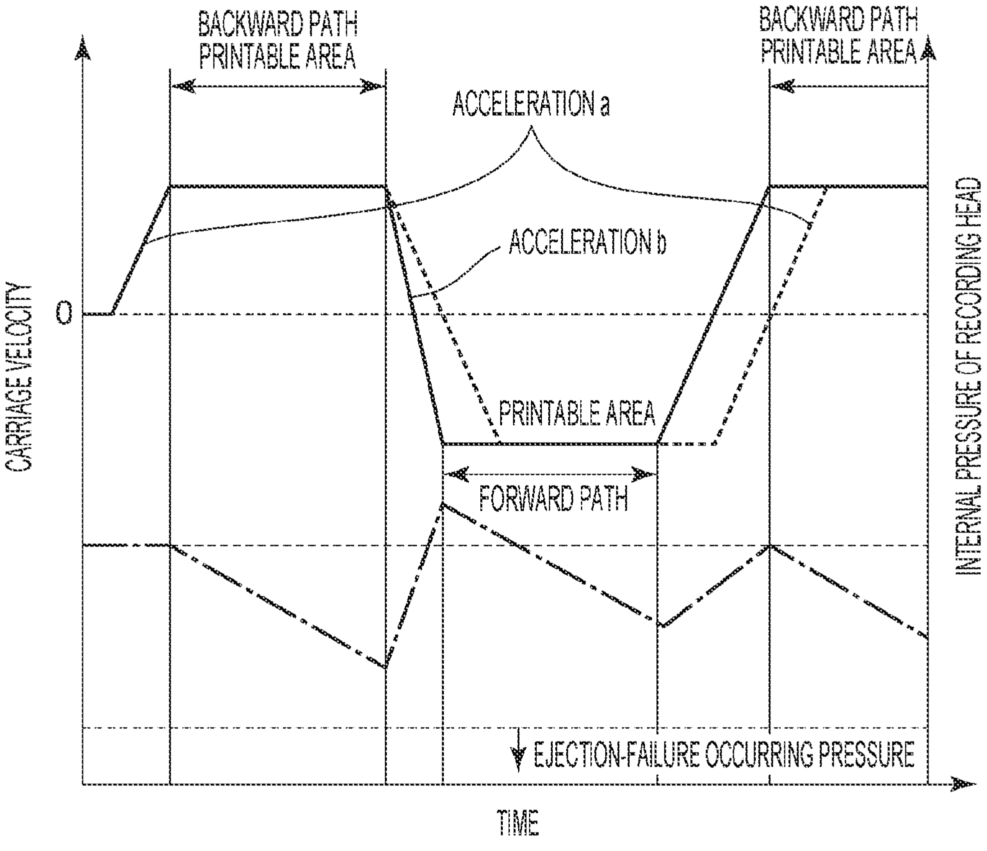
FIG. 5C is a graph showing the relationship between the velocity of the carriage and the internal pressure of the recording head using a profile 2 according to the embodiment.
Figure 6:
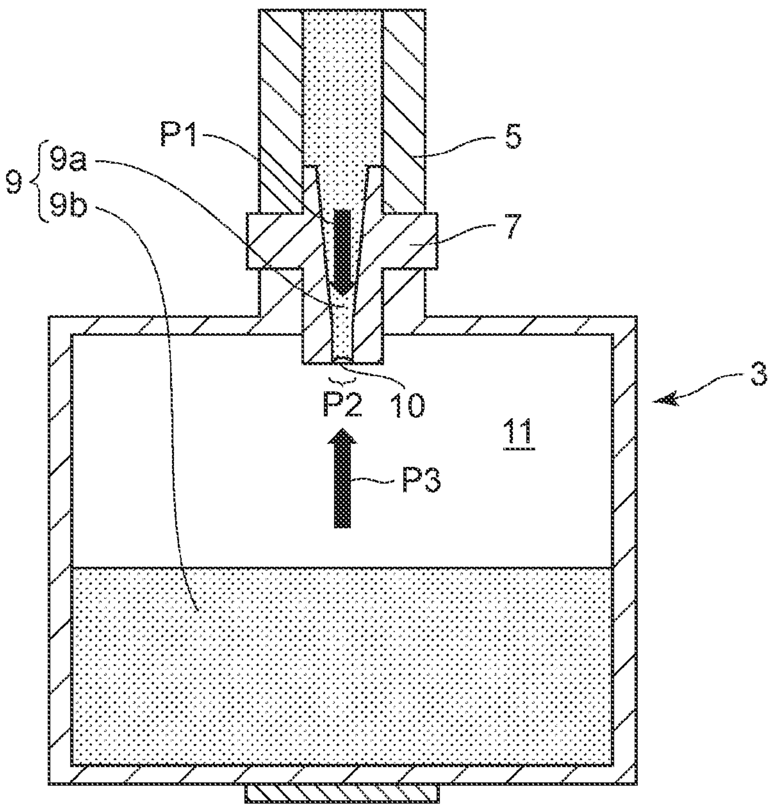
FIG. 6 is a schematic diagram illustrating pressures generated between the ink supply channel and the recording head according to the embodiment.

Next, a method for reducing a decrease in the pressure in the recording head 3 by controlling the acceleration of the carriage 2 will be described. FIGS. 5A to 5C show changes in the velocity of the carriage 2 (solid lines) and the internal pressure of the recording head 3 (dashed-dotted lines). FIGS. 5A to 5C show changes in the internal pressure of the recording head 3 when the carriage 2 is driven with a profile 1 in which the forward path and the backward path are controlled with acceleration a. The forward path is a moving path from the −X side to the +X side of the recording apparatus 1, and the backward path is a moving path from the +X side to the −X side of the recording apparatus 1. In FIGS. 5A to 5C, the velocity in the backward direction is a positive velocity. Referring to FIG. 6, dynamic pressure P1 generated in the ink 9*a* by driving the carriage 2 with acceleration a is lower than the withstand pressure P2 of the meniscus 10 at the tube joint 7. In other words, no ink is supplied to the recording head 3 through the ink supply channel 5 while no ink is ejected from the recording head 3.

FIG. 5A shows a change in the internal pressure of the recording head 3 when the amount of ink 9*b* ejected from the recording head 3 for one band of images is small. When the amount of the ink 9*b* ejected for one band of images is small, the decrease in the internal pressure of the recording head 3 due to backward printing is small. For this reason, the negative pressure generated because of the decrease in the internal pressure of the recording head 3 due to the backward printing causes the ink 9*a* to be supplied from the ink tank 4 to the recording head 3 before forward printing, resolving the decrease in the internal pressure.

FIG. 5B shows a change in the internal pressure of the recording head 3 when the amount of the ink 9*b* ejected for one band of images is large and when the carriage 2 is driven along the forward path and the backward path with the profile 1 with acceleration a. When the amount of the ink 9*b* ejected for one band of images is large, the decrease in the internal pressure of the recording head 3 due to backward printing is larger than that of FIG. 5A. For this reason, although the ink 9*a* is supplied from the ink tank 4 to the recording head 3 because of the negative pressure generated by the decrease in the internal pressure of the recording head 3, the ejection amount due to printing is larger than the amount of the ink 9*a* supplied to the recording head 3, which gradually decreases the internal pressure of the recording head 3. This increases the negative pressure in the recording head 3 to the ejection-failure occurring pressure shown in FIG. 5B, causing the ejection failure of the ink 9*b*.

In response to the above, control of the acceleration of the carriage 2 of this embodiment when the amount of the ink 9*b* ejected for one band of images is large will be described with reference to FIG. 5C. FIG. 5C shows a change in the internal pressure of the recording head 3 when the carriage 2 is driven with a profile 2 in which acceleration on the backward path and deceleration on the forward path are controlled with the absolute value a of the acceleration, and deceleration on the backward path and acceleration on the forward path are controlled with the absolute value b of the acceleration. In the profile 2, the absolute value of the acceleration of the carriage 2 is set to the absolute value b of the acceleration, which is greater than a, at the deceleration on the backward path and the acceleration on the forward path. In other words, the absolute value of the acceleration when the carriage 2 is accelerated on the forward path is set greater than the absolute value of the acceleration at deceleration on the forward path, and the absolute value of acceleration at deceleration on the backward path is set greater than the absolute value of acceleration at acceleration on the backward path. This causes the ink 9*a* in the section of length L of the ink supply channel 5, which moves with the movement in the X direction, which is the scanning direction of the carriage 2, to receive an inertia force larger than that at the absolute value a of acceleration because of the absolute value b of acceleration. In this case, the absolute value b of the acceleration is set so that the dynamic pressure P1 caused by the inertia force is higher than the withstand pressure P2 of the meniscus 10 formed at the tube joint 7, as shown in FIG. 6. In other words, the meniscus 10 is broken, so that the ink 9*a* moves from the interior of the ink supply channel 5 to the recording head 3. This causes, in addition to the ink 9*a* supplied from the ink tank 4 because of the negative pressure generated in the recording head 3 by the ejection of the ink 9*b*, the ink 9*a* in the ink supply channel 5 is supplied to the recording head 3 because of the dynamic pressure P1 generated because of the inertia force, thereby reducing an excessive decrease in the internal pressure of the recording head 3. The absolute value of acceleration at deceleration on the forward path of the carriage 2 and the absolute value of acceleration at acceleration on the backward path do not have to be a, but may be kept at a. The direction in which the inertia force due to the acceleration at deceleration on the forward path and at acceleration on the backward path is the +X direction, that is, the direction in which the ink increases in distance from the recording head 3. For this reason, an inertia force larger than the meniscus withstand pressure P2 could act to decrease the internal pressure of the recording head 3, making it difficult to supply the ink. It is important to set the absolute value of the acceleration of the carriage 2 at at least one of deceleration in the direction in which the length L of the ink supply channel 5 increases and acceleration in the direction in which the length L of the ink supply channel 5 decreases. The ink 9*a* in the ink supply channel 5 moves until the dynamic pressure P1 due to the inertia force and the pressure P3 in the recording head 3 become balanced out. In other words, controlling the carriage 2 to acceleration at which the dynamic pressure P1 due to the inertia force does not become positive so that the pressure P3 in the recording head 3 is constantly kept negative prevents the ink 9*b* from leaking from the recording head 3. Therefore, the ink-jet recording apparatus 1 of this embodiment eliminates the need for sensing the pressure in the recording head 3 using a pressure sensor or the like, allowing for maintaining an appropriate pressure with a simple configuration.

The dynamic pressure P1 generated because of the acceleration of the carriage 2 may be adjusted by changing the inside diameter D1 of the tube joints 7 shown in FIG. 3. Increasing the inside diameter D1 decreases the dynamic pressure P1 generated. In contrast, decreasing the inside diameter D1 increases the dynamic pressure P1 generated. In other words, changing the acceleration of the carriage 2 and the inside diameter D1 of the tube joint 7 according to the configuration of the ink supply system allows for appropriately setting the dynamic pressure P1 generated. The absolute value of the acceleration of the carriage 2 may be increased outside the printable area in consideration of the printing accuracy. While the absolute value of the acceleration at acceleration and at deceleration is set to a, the absolute vale may be any other absolute value at which the ink 9*a* does not move to the recording head 3 by the inertia force.

A processing procedure for the ink-jet recording apparatus 1 of this embodiment using this principle will be described with reference to FIG. 7. This process is started when the ink-jet recording apparatus 1 receives print data for recording from the host device. The received print data is temporarily stored in the RAM 403.

First, in step S601, the CPU 401 reads the received print data from the RAM 403.

In step S602, the CPU 401 controls the image processing circuit 409 to execute a process for converting the print data to record data for using the recording head 3 (binarizing process). The CPU 401 counts the amount of ink ejected for each band of the processed print data. Here, the CPU 401 counts the number of ejections (dot number). The CPU 401 temporarily stores the information on the counted dot number in the RAM 403.

In step S603, the CPU 401 controls the feed roller to feed recording media from the sheet feed tray 15 or the cassette 16.

In step S604, the CPU 401 reads the dot count per band calculated in step S602 for the next recording. If it is at the start of recording, the CPU 401 reads the dot count of one band for the first recording.

In step S605, the CPU 401 determines whether the read dot count of the band is greater than a threshold X.

If, in step S605, the CPU 401 determines that the dot count is not greater than the threshold X, the process goes to step S606. If the dot count is equal to or less than the threshold X, the amount of the ink 9*b* ejected from the recording head 3 is small, and the decrease in the internal pressure of the recording head 3 caused by the recording of the bank is small. For this reason, in step S606, the CPU 401 transmits a signal for controlling the carriage 2 with the profile 1, described in FIG. 5A, to the CR-motor driving circuit 414, so that the recording head 3 ejects ink on the basis of the print data while the carriage 2 is scanning with the profile 1 to perform recording of one band on the recording medium.

In contrast, if in step S605 the CPU 401 determines that the dot count is greater than the threshold X, the process goes to step S607. When the dot count is greater than the threshold X, the amount of the ink 9*b* ejected from the recording head is large, and the decrease in the internal pressure of the recording head 3 due to the recording of the band is small. For this reason, in step S607, the CPU 401 transmits a signal for controlling the carriage 2 with the profile 2, described in FIG. 5C, to the CR-motor driving circuit 414, and the recording head 3 ejects ink on the basis of the print data while the carriage 2 is scanning with the profile 2 to perform recording of one band on the recording medium.

Upon completion of recording of one band, the process goes to step S608, in which the CPU 401 determines whether the next band to be recorded is present. If yes, the process returns to step S605 for processing of the next band. If no, the process ends.

Thus, if the amount of ejection from the recording head 3 is large, the profile for scanning the carriage 2 is changed to move the ink 9*a* from the ink supply channel 5 to the recording head 3, thereby increasing the internal pressure of the recording head 3. Repeating this operation for each band prevents the internal pressure of the recording head 3 from decreasing significantly to cause an ejection failure in recording print data that requires a large amount of ink ejected from the recording head 3.

Other Embodiments

Although the above embodiment moves the carriage 2 with the two profiles, an additional profile may be used.

Figure 8:
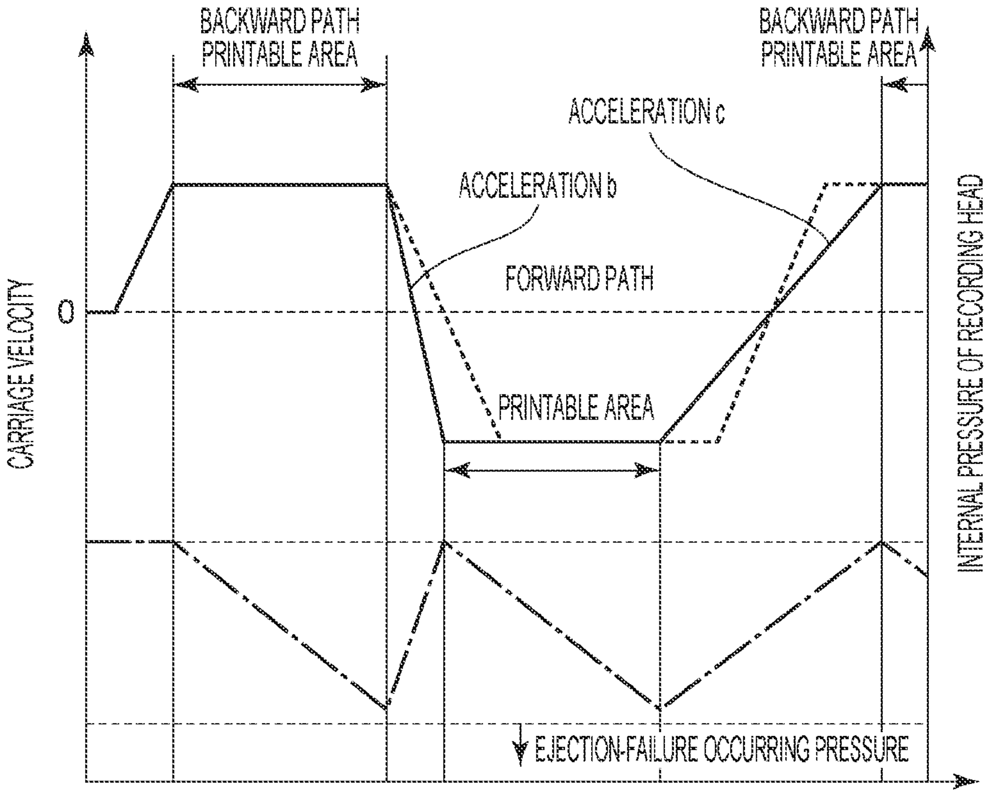
FIG. 8 is a graph showing the relationship between the velocity of the carriage and the internal pressure of the recording head using a profile 3 according to another embodiment.

FIG. 8 illustrates changes in the velocity of the carriage 2 (the solid line) and the internal pressure of the recording head 3 (the dashed-dotted line) in the case where the amount of the ink 9*b* ejected from the recording head 3 is larger that of FIG. 5B.

The carriage 2 is driven with a profile 3 in which the deceleration on the backward path and the acceleration on the forward path are controlled with the absolute value b of acceleration, and the deceleration on the forward path and the acceleration on the backward path are controlled with the absolute value c of the acceleration. With this profile 3, the absolute value of the acceleration of the carriage 2 at the deceleration on the backward path and at the acceleration on the forward path is set to the absolute value b of the acceleration greater than a, and in addition, the absolute value of the acceleration at the deceleration on the forward path and at the acceleration on the backward path is set to the absolute value c of acceleration less than a. This causes, in the area of the absolute value b of acceleration, the ink 9*a* in the portion of length L in the ink supply channel 5 moves to the recording head 3 because of the inertia force to increase the internal pressure of the recording head 3. Furthermore, in the area of the absolute value c of acceleration, the time from the start of deceleration on the forward path to the end of acceleration on the backward path is increased. During this time, the ink 9*a* is supplied from the ink tank 4 to the recording head 3 to resolve the decrease in the internal pressure. This allows for reducing the decrease in the internal pressure of the recording head 3 even if the amount of the ink 9*b* ejected is large.

Figure 7:
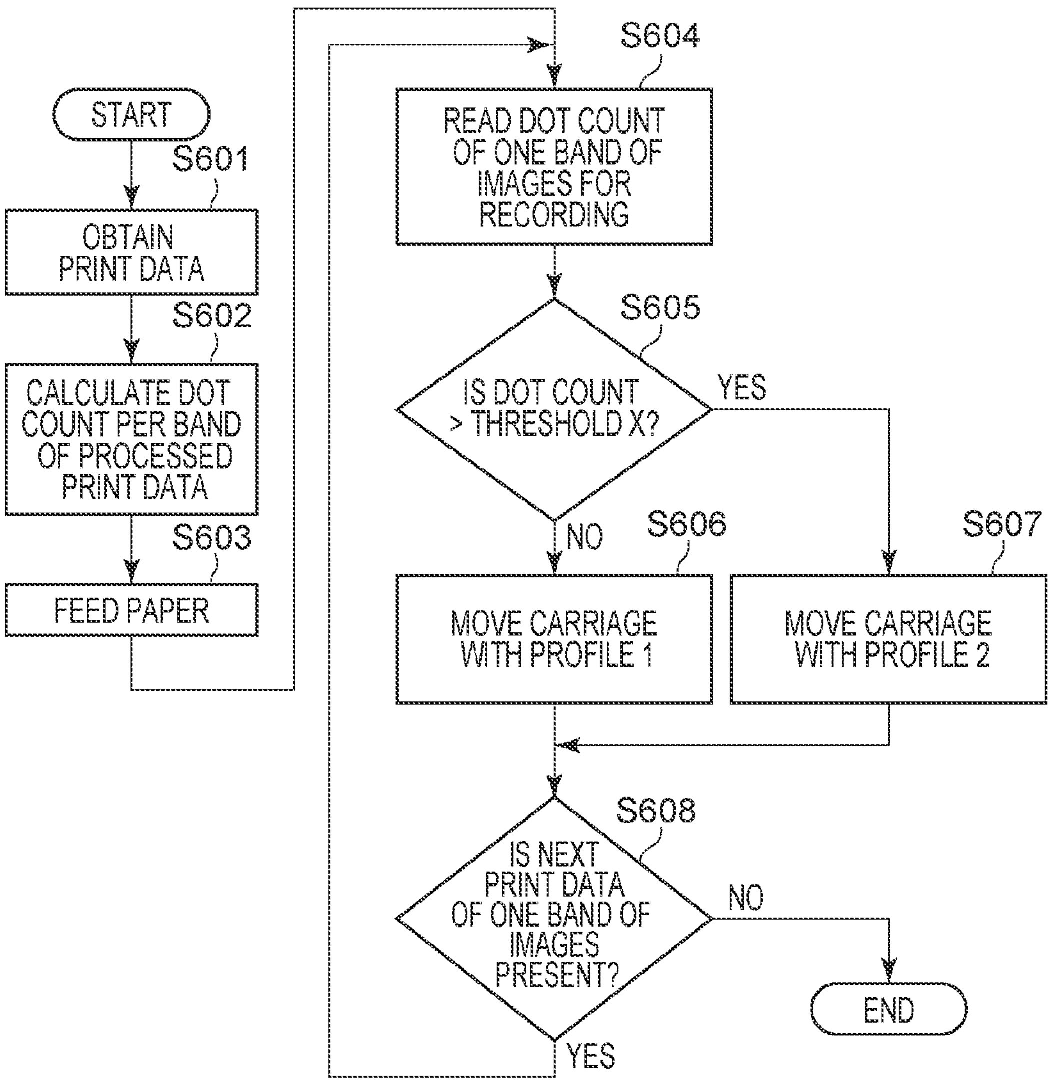
FIG. 7 is a flowchart for the operation of the ink-jet recording apparatus according to the embodiment.

Although the above embodiment changes the profile for the carriage 2 for each dot count of one image band, as shown in FIG. 7, the profile may be changed according to the print mode, the carriage velocity, and the nozzle area of the recording head 3. For the print mode, if a high-print-velocity mode is selected by the user, a large amount of ink 9*b* is ejected per unit time from the recording head 3. For this reason, the profile is changed to a profile in which the absolute value of the acceleration of the carriage 2 changes abruptly. For the carriage velocity, the higher the velocity of the carriage 2, and for the nozzle area of the recording head 3, the larger the nozzle area, a large amount of ink 9*b* is ejected per unit time from the recording head 3. For this reason, thresholds may be set for the carriage velocity and the nozzle area of the recording head 3, and when they reach the thresholds or greater, the profile may be changed to a profile for increasing the absolute value of the acceleration of the carriage 2.

This embodiment can reduce a decrease in image quality.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of priority from Japanese Patent Application No. 2021-090148, filed May 28, 2021, which is hereby incorporated by reference herein in its entirety.

What is claimed is:

1. A recording apparatus comprising:

an ink tank configured to store ink;

a recording head including a nozzle that ejects the ink;

a carriage having the recording head on board and configured to reciprocate in a first direction and a second direction;

an ink supply channel configured to supply the ink from the ink tank to the recording head and having a bend that moves with movement of the carriage;

one or more memory devices that store a set of instructions; and one or more processors to execute the set of instructions to perform operations including:

causing the carriage to move;

causing the recording head to eject the ink based on print data to perform recording on a recording medium; and obtaining, based on the print data, information on an amount of ink to be ejected to a recordable area in which the carriage moves in one of the first direction and the second direction, wherein a length of the ink supply channel from the bend to the recording head increases in the first direction and decreases in the second direction, wherein the one or more processors changes acceleration of the carriage according to the amount of ink to be ejected to the recordable area, the amount being indicated by the information, wherein, in a case where the amount of ink to be ejected to the recordable area is greater than a predetermined value, in recording operation of one image, the one or more processors controls the carriage so that an absolute value of acceleration at deceleration of the carriage, in the first direction in which a length from the bend to the recording head in the ink supply channel is increased by the movement of the carriage, is greater than an absolute value of acceleration at acceleration of the carriage in the first direction in which a length from the bend to the recording head in the ink supply channel is increased by the movement of the carriage.

2. The recording apparatus according to claim 1, wherein, when the amount of ink to be ejected to the recordable area, is less than or equal to a predetermined value, the one or more processors controls the carriage so that an absolute value of acceleration at deceleration of the carriage is less than an absolute value of acceleration at deceleration of the carriage when the amount of ink to be ejected to the recordable area is greater than the predetermined value.

3. The recording apparatus according to claim 1, wherein, when the amount of ink to be ejected to the recordable area is greater than a predetermined value, the one or more processors controls the carriage so that an absolute value of acceleration at acceleration of the carriage is less than an absolute value of acceleration at acceleration of the carriage when the amount of ink to be ejected to the recordable area is less than or equal to the predetermined value.

4. The recording apparatus according to claim 1, wherein, when the amount of ink to be ejected to the recordable area is greater than a predetermined value, the one or more processors controls the carriage so that an absolute value of acceleration at acceleration of the carriage, in the second direction, in which a length from the bend to the recording head in the ink supply channel is decreased by the movement of the carriage, is greater than an absolute value of acceleration at deceleration of the carriage in the second direction in which a length from the bend to the recording head in the ink supply channel is decreased by the movement of the carriage.

5. The recording apparatus according to claim 1, wherein, when the amount of ink to be ejected to the recordable area is less than or equal to a predetermined value, the one or more processors controls the carriage so that absolute values of acceleration at acceleration and at deceleration of the carriage are equal to each other.

6. The recording apparatus according to claim 1, wherein the one or more processors controls the carriage so that an absolute value of acceleration at deceleration, in the second direction, when the amount of ink to be ejected to the printable area is a second value greater than a first value, is less than an absolute value of acceleration at deceleration in the second direction, when the second value is less than or equal to the first value.

7. The recording apparatus according to claim 1, wherein the one or more processors controls the carriage so that an absolute value of acceleration at acceleration, in the first direction when the amount of ink to be ejected to the printable area is a second value greater than a first value, is less than an absolute value of acceleration at acceleration in the first direction when the second value is less than or equal to the first value.

8. The recording apparatus according to claim 1, wherein, when the amount of ink to be ejected to the recordable area is greater than a predetermined value, the one or more processors controls the carriage so that absolute values of acceleration at acceleration and at deceleration of the carriage differ from each other.

9. The recording apparatus according to claim 1, wherein the ink in the ink supply channel and the ink in the recording head are separated by an air space in the recording head.

10. The recording apparatus according to claim 9, wherein, when no ink is to be ejected from the recording head, no ink is supplied to the recording head through the ink supply channel.

11. The recording apparatus according to claim 10, further comprising:

a joint connecting the ink supply channel to the recording head, wherein a portion of the joint has an inside diameter to prevent a meniscus from being broken when no ink is ejected from the recording head.

12. A method for recording, comprising:

ejecting ink from a nozzle of a recording head disposed on a carriage to perform recording on a recording medium by moving the recording head with the carriage;

supplying ink from an ink tank storing the ink to the recording head through an ink supply channel having a bend that moves with movement of the carriage;

obtaining, based on print data for recording, information on an amount of ink to be ejected to a recordable area in which the carriage moves in one of a first direction and a second direction opposite to the first direction; and changing acceleration of the carriage according to the amount of ink to be ejected to the printable area, the amount being indicated by the information obtained, wherein, in a case where the amount of ink to be ejected to the recordable area is greater than a predetermined value, in recording operation of one image, the carriage is controlled so that an absolute value of acceleration at deceleration of the carriage, in the first direction in which a length from the bend to the recording head in the ink supply channel is increased by the movement of the carriage, is greater than an absolute value of acceleration at acceleration of the carriage in the first direction in which a length from the bend to the recording head in the ink supply channel is increased by the movement of the carriage.

13. The method according to claim 12, further comprising:

when the amount of ink to be ejected to the recordable area, is less than or equal to a predetermined value, controlling the carriage so that an absolute value of acceleration at deceleration of the carriage is less than an absolute value when the amount of ink to be ejected to the recordable area is greater than the predetermined value.

14. The method according to claim 12, further comprising:

when the amount of ink to be ejected to the recordable area is greater than a predetermined value, controlling the carriage so that an absolute value of acceleration at acceleration of the carriage is less than an absolute value when the amount of ink to be ejected to the recordable area is less than or equal to the predetermined value.

15. The method according to claim 12, further comprising:

when the amount of ink to be ejected to the recordable area is greater than a predetermined value, controlling the carriage so that absolute values of acceleration at acceleration and at deceleration of the carriage differ from each other.

16. The method according to claim 12, further comprising:

when the amount of ink to be ejected to the recordable area is greater than a predetermined value, controlling the carriage so that an absolute value of acceleration at acceleration, in a direction in which a length from the bend to the recording head in the ink supply channel is decreased by the movement of the carriage, is greater than an absolute value of acceleration at deceleration.

* * * * *